US005632499A

United States Patent [19]

Hutcherson et al.

[11] Patent Number: 5,632,499

[45] Date of Patent: May 27, 1997

[54] WHEEL CHAIR SYSTEM

[75] Inventors: Brian K. Hutcherson, Laporte County; Michael A. Bianco, Porter County, both of Ind.

[73] Assignee: GTMAX, Inc., Michigan City, Ind.

[21] Appl. No.: 470,338

[22] Filed: Jun. 6, 1995

[51] Int. Cl.$^{6}$ .................................................. B62M 1/16

[52] U.S. Cl. ................ 280/246; 280/250.1; 297/DIG. 4; 474/74

[58] Field of Search ..................................... 280/200, 210, 280/241, 242.1, 243, 244, 246, 247, 248, 250.1, 304.1; 297/DIG. 4; 74/810.1; 474/69, 73, 74

[56] References Cited

U.S. PATENT DOCUMENTS

| | | | |
|---|---|---|---|
| 3,994,509 | 11/1976 | Schaeffer | 280/244 X |
| 4,247,127 | 1/1981 | Wilkes | 280/250.1 X |
| 4,324,414 | 4/1982 | Wilkes | 280/250.1 X |
| 4,840,076 | 6/1989 | Brubaker et al. | 280/246 X |
| 4,941,540 | 7/1990 | Bernstein | 280/250.1 |
| 5,020,815 | 6/1991 | Harris et al. | 280/246 |
| 5,184,837 | 2/1993 | Alexander | 180/65.1 |
| 5,263,729 | 11/1993 | Watwood et al. | 280/246 |

*Primary Examiner*—Kevin Hurley
*Attorney, Agent, or Firm*—E. L. Levine

[57] ABSTRACT

A wheel chair system including a pair of levers mounted to each side of an operator seated in the wheelchair, each lever having a handle which the operator can articulate between a position aligned with the levers and a position normal to the levers. The levers are each connected to a planetary gear system and a double ratchet assembly and are movable by the operator forwardly and rearwardly through an arc. Each double ratchet assembly is connected to two chains, one of which is driven when the lever is rotated in one direction and the other of which is driven when the ratchet is rotated in the opposite direction. The handles, levers, ratchets and gears are configured and interconnected such that when the operator moves the handles and levers through a rowing motion, the wheel chair is powered in a forward direction. The gear set can be chosen, and modified, to be compatible with the strength characteristics of the upper body musculature of the operator.

16 Claims, 12 Drawing Sheets

WHEEL CHAIR SYSTEM

BACKGROUND OF THE INVENTION

1. Field of the Invention

This invention relates to a wheeled conveyance system, and more particularly to a manually or power driven wheelchair and transmission system for a wheelchair.

2. Description of the Prior Art

Numerous types of wheelchair systems exist. Such systems, however, generally do not take good advantage of the musculature of the human body. The wheelchairs are customarily designed without the capability to readily match the system to the strength or stature of the particular operator or to differing uses.

The most common systems utilize two large hand driven wheels. A problem with such systems, particularly when used outside, is that the operator's hands and arms are in contact with or close to the driving wheels, which wheels are in contact with the ground. This creates an unclean environment about the operator's arms and hands. Use of the wheels also tends to callous the hands of the operator, and requires frictional restraint by the hands for braking. And, such systems place stresses on the operator's arms and hands which result in physical problems such as, for example, carpal tunnel syndrome.

Manually powered wheel chair systems require use of upper body musculature, and typically require use of the operator's arms positioned to the side of the body. This positioning relies heavily on the operator's triceps, and does not take good advantage of additional upper body and arm characteristics. For example, the biceps of the human body are typically more powerful than the triceps. Biceps are more useful when pulling, and triceps are more useful when pushing.

Additionally, the pectoral muscles provide strength, particularly when used together with the biceps. Pectoral muscles, however, do not provide as much aid to the triceps. In most present wheel chair systems the operator pushes forwardly on the upper portion of the wheels, inputting power, but the operator does not input energy on the return of the hands and arms to position for the next push stroke. There are systems marketed by Rock N'Roll Inc. of Texas wherein forward and rearward motion of handlebars on bicycle type structures is inputted as power to a specially configured gear system.

Additionally, present systems are designed for a broad cross section of users, without consideration of the musculature strength of an operator or the modification of that strength over time, for example, as a young operator grows.

It is therefore desirable to provide a manually powered wheel chair system, and a transmission for wheelchairs, which improves upon these and other limitations. It is also desirable to provide such systems which are compatible with power mechanisms.

SUMMARY OF THE INVENTION

The invention consists of certain novel features and structural details hereinafter more fully described, illustrated in the accompanying drawings, and particularly pointed out in the appended claims, it being understood that various changes in the details may be made without departing from the spirit, or sacrificing any of the advantages of the present invention.

This invention provides an improved wheel chair system and drive transmission system for a wheelchair with improved use characteristics. It readily accommodates differences among operators, particularly with respect to upper body strength.

Among other features, drive wheels are powered by a drive train system wherein the operator's hands do not contact or come particularly close to the drive wheels for powering or for braking. It allows the operator's hands and arms to remain more in front of the body, rather than to the side of the body.

In a preferred embodiment a wheelchair includes a frame, two operator powered aft drive wheels, and two forward slave wheels. Each drive wheel is powered by a transmission system. The operator sits on a conventional seat mounted to the frame which can have any of a number of features known in the art including, for example, the ability to raise or lower the seat, to adjust the seat forwardly and rearwardly, and to mount the slave wheels to extend forwardly from the frame.

The preferred transmission includes an oar lever extending forwardly of each left hand and right hand transmission assembly. The levers are pivotally mounted to reciprocate through a limited arc, forwardly-and-downwardly and then rearwardly-and-upwardly. The operator grips a handle at the end of each lever which is pivotably mounted to rotate between a position generally aligned with the lever and a position generally normal to the lever. To drive the wheelchair the operator moves through a rowing type motion. With the handles aligned with the levers, the levers are pushed forwardly and downwardly. The operator then rotates the handles to the position normal to the levers and pulls the levers rearwardly and upwardly. This coordinated movement of the levers and handles by the operator, cooperating with structure including double ratchet assemblies, planetary gear assemblies, and drive chains, ultimately powers the drive wheels. The levers and handles each include an actuator which cooperates with the double ratchet assembly to place the transmission in a forward or a rearward drive configuration. The actuator can also be set in a neutral position.

The double ratchet assembly is structured so as to transmit a force through a first sprocket into a first chain when the lever is rotated forwardly, and to transmit a force through a second sprocket into a second chain when the lever is rotated rearwardly. The second sprocket freewheels when the first sprocket is transmitting a force, and the first sprocket freewheels when the second sprocket is transmitting a force. With the actuator in the forward drive position, the first sprocket is restrained against, for example, clockwise motion and the second sprocket is restrained against counter-clockwise motion. When the actuator is placed in the rearward drive position, the first sprocket is restrained against counter-clockwise motion and the second sprocket is restrained against clockwise motion.

Movement of the handle between the aligned and normal orientations selectively positions two brake bands, which are interconnected with the planetary gear assembly, between a restrained position and a free position. One band restrains the ring gear and allows driving of the planet carrier, and the other band restrains the planet carrier and allows driving of the ring gear.

Motion other than straight forwardly can be achieved by varying the movement inputted to the respective right hand and left hand levers and handles. Rearward motion can be achieved by setting the actuators in the rearward drive configuration and performing the normal rowing motion sequence. Or, the operator can set one actuator for forward motion and one actuator for rearward motion and simultaneously push one and pull the other lever to rotate in a tight circle generally about the polar axis. With practice the operator will learn to combine positioning of the handles and actuators and movement of the levers to vary and control the speed, direction and turning radius of the conveyance.

A caliper brake system, similar to that on a bicycle, can be operated with the operator's hands remaining on the handle. A power drive can readily be affixed to the wheel chair system and interconnected with the transmissions for powered or power assisted movement.

It will therefore be recognized that the instant invention teaches an improved wheel chair and transmission system which takes greater advantage of the musculature of the human body and which removes the operator's hands from the immediate vicinity of the wheels.

DESCRIPTION OF THE DRAWINGS

The advantages, nature and additional features of the invention will become more apparent from the following description, taken in connection with the accompanying drawings, in which.

DESCRIPTION OF PREFERRED EMBODIMENTS

Figure 1:
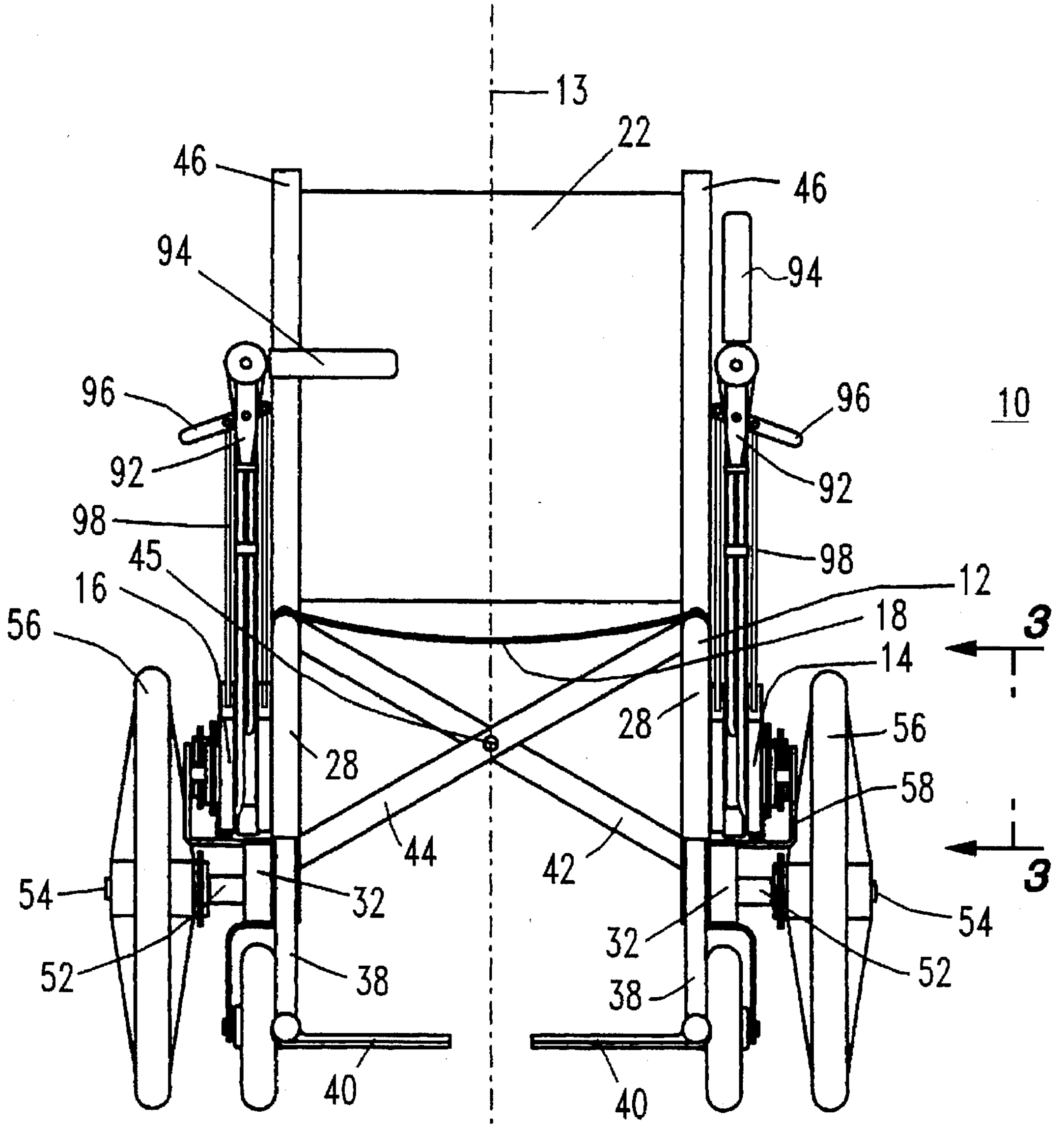
FIG. 1 is a front elevation view of a wheel chair system in accordance with the invention.

Shown in FIG. 1 is a wheel chair system 10 in accordance with this invention. The wheelchair system 10 includes a frame assembly 12 and, from the position of a seated operator, a left hand 14 and a right hand 16 transmission assembly. Mounted on the frame assembly 12 is an operator's seat 18 and a seat back 22. The seat 18 and seat back 22 are flexible textile material although many other seat configurations and options well known in the art can be utilized.

Figure 2:
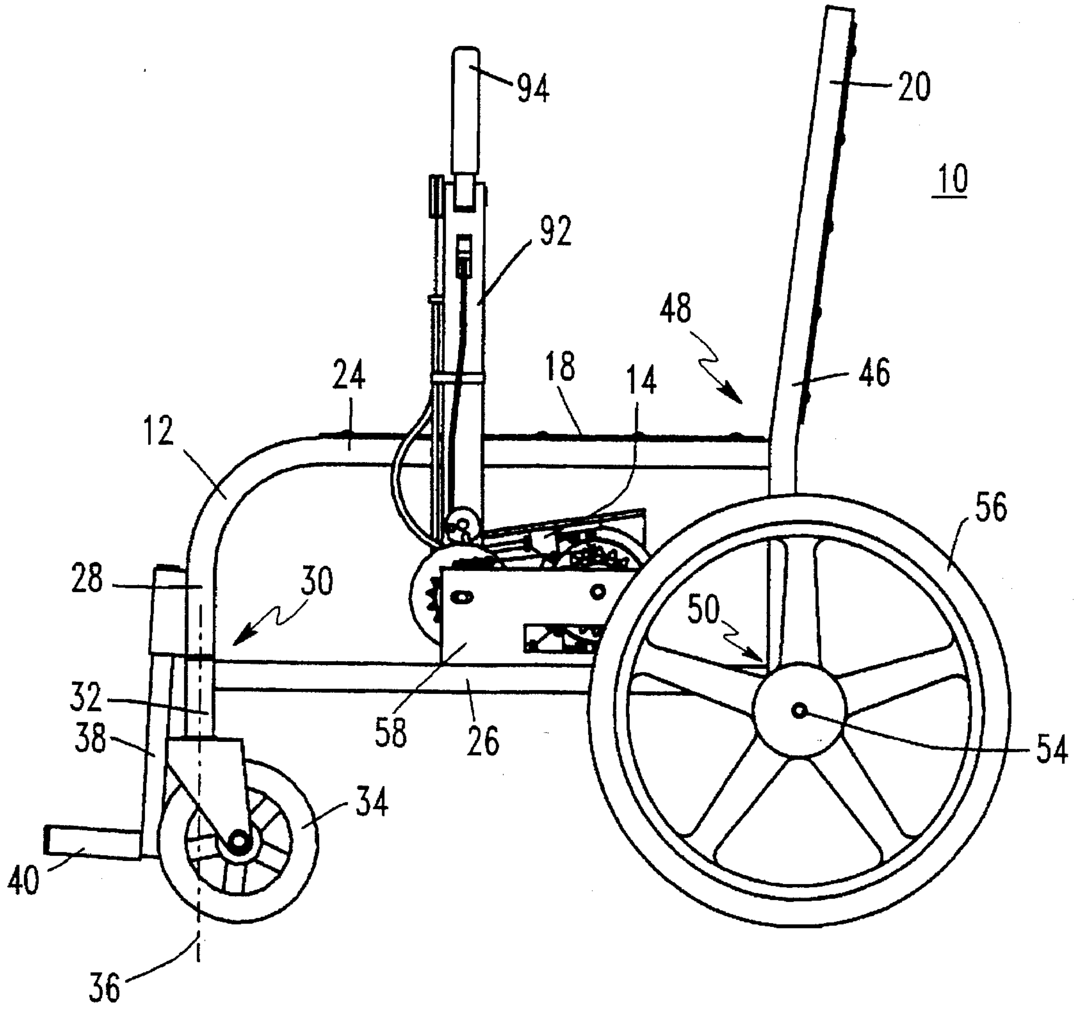
FIG. 2 is a side elevation view of the wheelchair system of FIG. 1.
Figure 3:
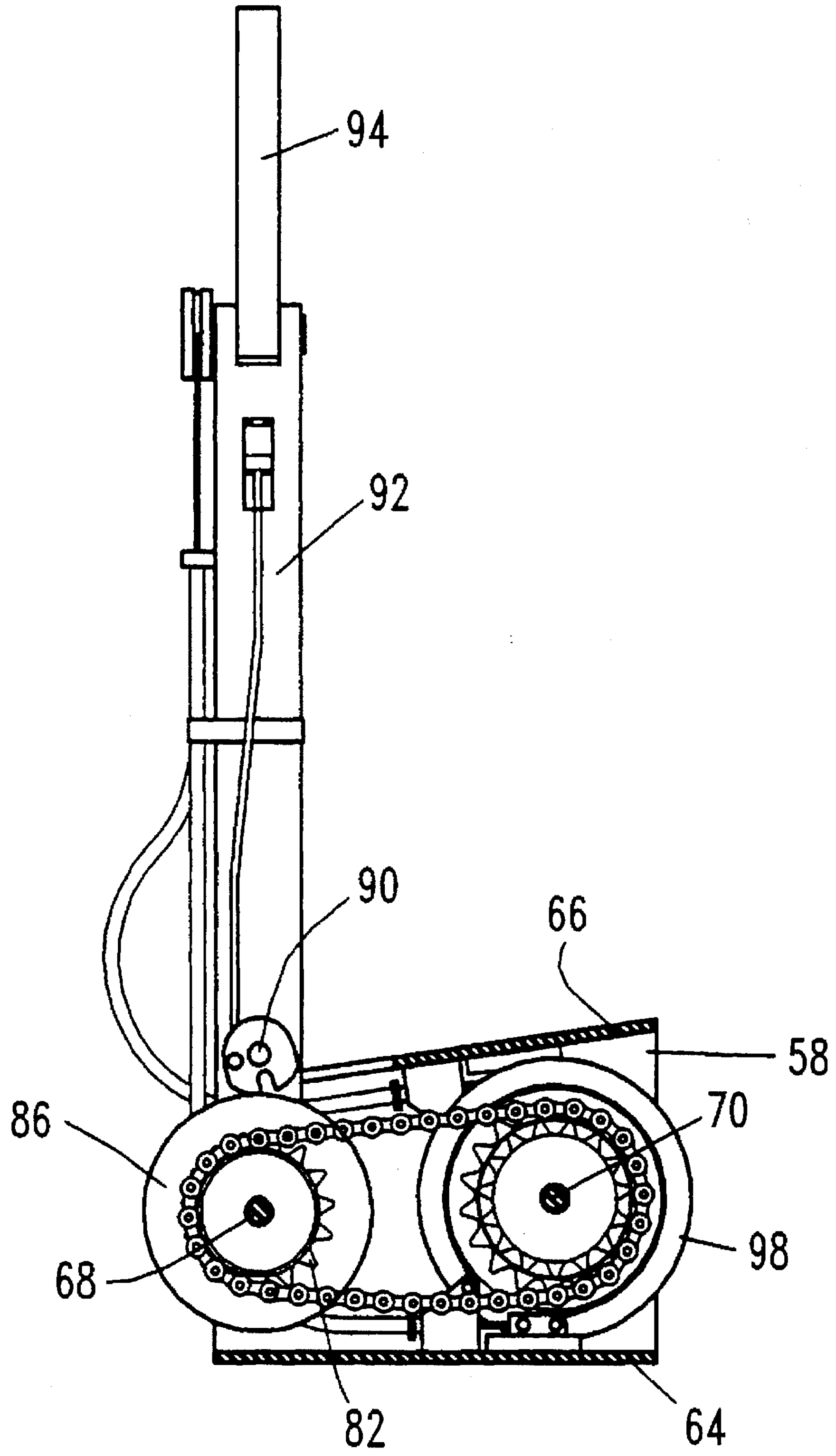
FIG. 3 is a side view of a portion of a left hand transmission assembly of the wheelchair system.

Referring to FIGS. 1 and 2, the frame assembly 12 is symmetrical about a central axis 13 and includes, on each side, a first generally horizontal support tube 24 and a second generally horizontal support tube 26. First support tube 24 bends into a generally vertical component 28 which is welded to second support tube 26 as indicated at reference numeral 30. Also welded to vertical component 28 is a pivot housing 32. The pivot housing is connected to a front slave wheel 34 which is pivotable freely about an axis 36. A foot rest support 38 is welded to vertical component 28 and includes a folding foot piece 40. The support tubes 24, 26 are joined by cross tubes 42, 44. The cross tubes 42, 44 can be arranged rigidly or, as well known, pivotally about pin 45 in a manner to allow the wheelchair 10 to fold inwardly toward axis 13. The frame also includes back tubes 46 welded to the first support tube 24 as indicated at reference numeral 48 and to second support tube 26 as indicated at reference numeral 50. An axle bracket 52 is welded to back tube 46 and supports an axle 54. Mounted to rotate about axle 54 is a drive wheel 56. The axes of the left and right drive wheels are preferably aligned. The basic frame and wheel structure above described is well known in the art and many other basic chair, frame and wheel configurations are equally possible for use in connection with the structures subsequently described herein.

Each transmission assembly 14, 16 includes similar components, and the left hand assembly 14 is here described in detail. The left 14 and right 16 transmission assemblies are preferably configured as mirror images of one another. The transmission assembly 14 is affixed to the frame assembly 12 through a bracket 58. Referring now to FIGS. 3 through 8, the bracket 58 is generally U-shaped in cross section having an inner side 60, an outer side 62, a bottom 64, and an upper horizontally oriented wing 66. Rotatably supported between the inner side 60 and outer side 62 of the bracket 58 are an oar hub axle 68 about oar hub axis 69 and a planetary gear axle 70 about planetary gear axis 71.

Figure 6:
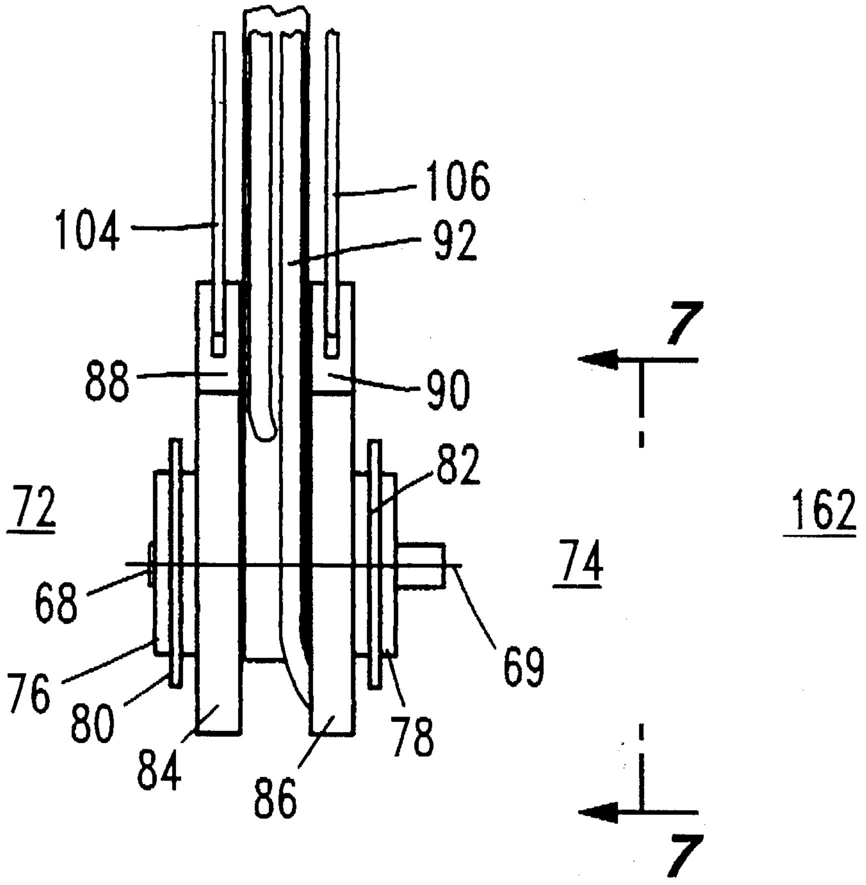
FIG. 6 is a front elevation view of an oar lever and double clutch ratchet hub and sprocket assembly in accordance with an embodiment of the invention.
Figure 7A:
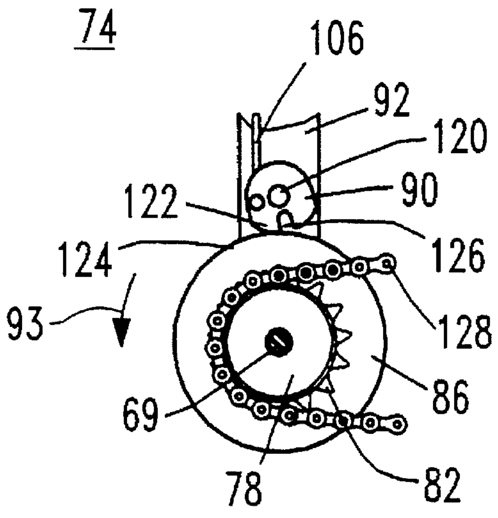
FIG. 7A is a side elevation view of a portion of the oar lever and hub assembly of FIG. 6 showing a cam in one operational position.
Figure 7B:
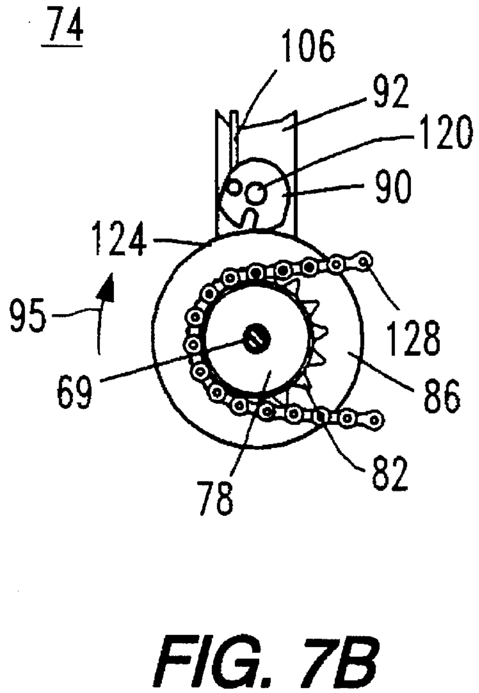
FIG. 7B is a side elevation view similar to FIG. 7A, showing the cam in another operational position.

As shown best in FIGS. 6, 7A and 7B, the oar hub assembly includes an inside 72 and an outside 74 rotary clutch mechanism, adjacent and aligned with one another along axis 69, which are fitted with inner 76 and outer 78 drive sprockets for a rotational output. The rotational driving direction of each rotary clutch mechanism 72, 74 is opposite to the other. Similarly, the freewheel rotational direction of each rotary clutch mechanism 72, 74 is opposite to the other. The inner sprocket 76 has chain engaging inner teeth 80 affixed thereto, and the outer sprocket 78 has chain engaging outer teeth 82. An outer drive chain 128 is mounted about outer teeth 82. The clutch mechanisms 72, 74 include inner 84 and outer 86 friction drums which form a rigid assembly together with the respective drive sprocket and teeth. Thus, drum 84, sprocket 76 and teeth 80 rotate together as a single unit. An inner cam 88 and outer cam 90 cooperate with respective inner friction drum 84 and outer friction drum 86 to allow the respective drum to be restrained from motion in one rotational direction or the other, relative to the cam, dependent upon the selective position of the cam.

Referring to FIG. 7A, when outer cam 90 is in the position shown, outer friction drum 86 is restrained from clockwise rotation relative to cam 90, but can freewheel in the counterclockwise direction as indicated at arrow 93. In this orientation counterclockwise movement of an oar lever 92 about axis 69 and corresponding movement of affixed outer cam 90 in the counterclockwise direction will drive outer friction drum 86 in the counterclockwise direction as indicated at arrow 93. Thus, counterclockwise rotation of the oar lever 92 about axis 69 also drives outer friction drum 86 in a counterclockwise rotation about axis 69. However, clockwise rotation of the oar lever 92 about axis 69 imparts no driving force into outer friction drum 86.

When outer cam 90 is in the position shown in FIG. 7B, outer friction drum 86 is restrained from counterclockwise rotation relative to cam 90, but can freewheel in the clockwise direction as indicated at arrow 95. In this orientation clockwise movement of the oar lever 92 about axis 69 and corresponding movement of affixed outer cam 90 in the clockwise direction will drive outer friction drum 86 in the clockwise direction as indicated at arrow 95.

When outer cam 90 is in the position shown in FIG. 7A, restraining outer friction drum 86 from clockwise rotation relative to outer cam 90, inner cam 88 is in a position that restrains inner friction drum 84 from counter-clockwise rotation relative to inner cam 88. Likewise, when outer cam 90 is in the position shown in FIG. 7B, restraining outer friction drum 86 from counter-clockwise rotation relative to outer cam 90, inner cam 88 is in a position that restrains inner friction drum 84 from clockwise rotation relative to inner cam 88.

Figure 8:
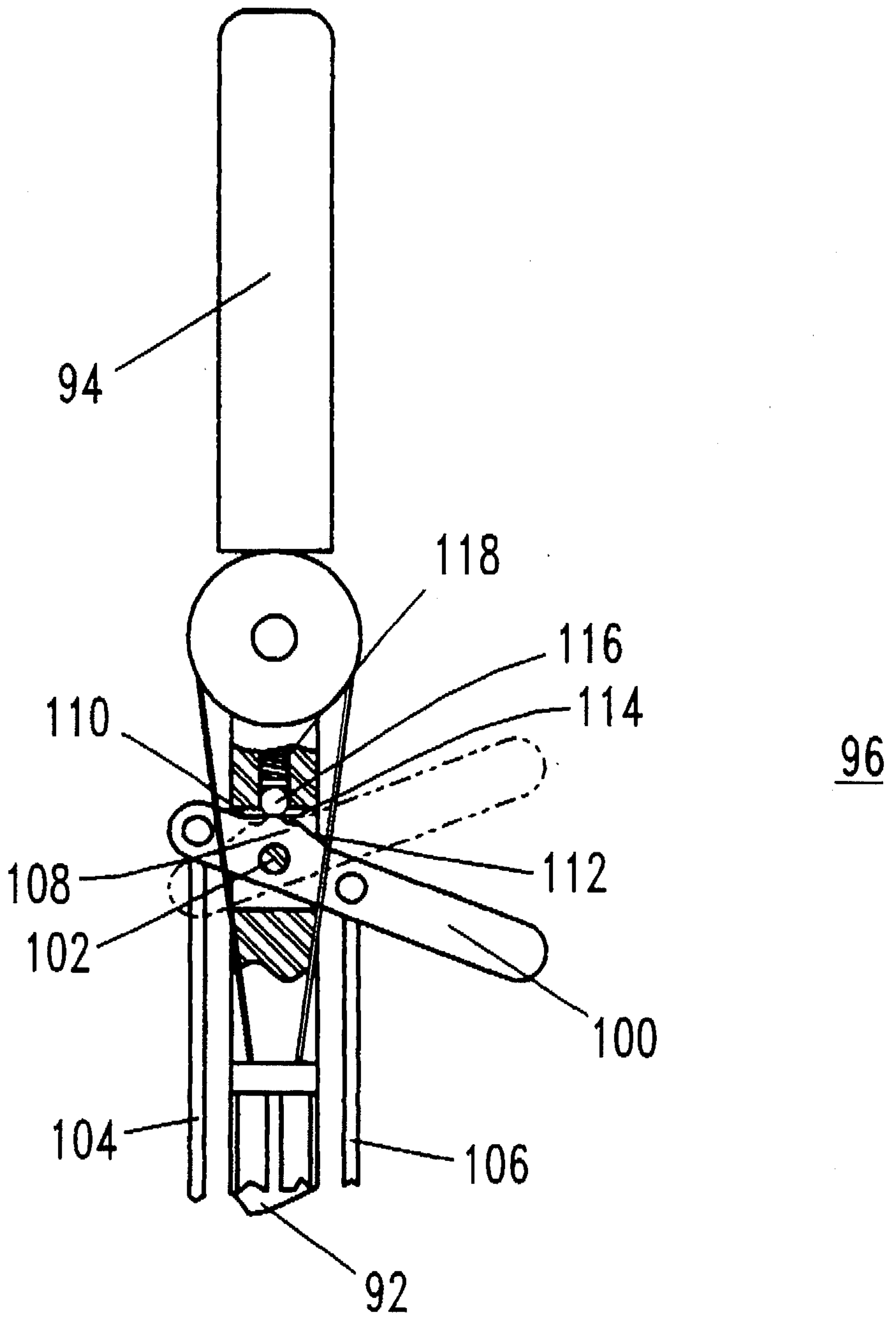
FIG. 8 is a front elevation view of one extremity of the lever showing a ratchet direction actuator in alternate positions.
Figure 9:
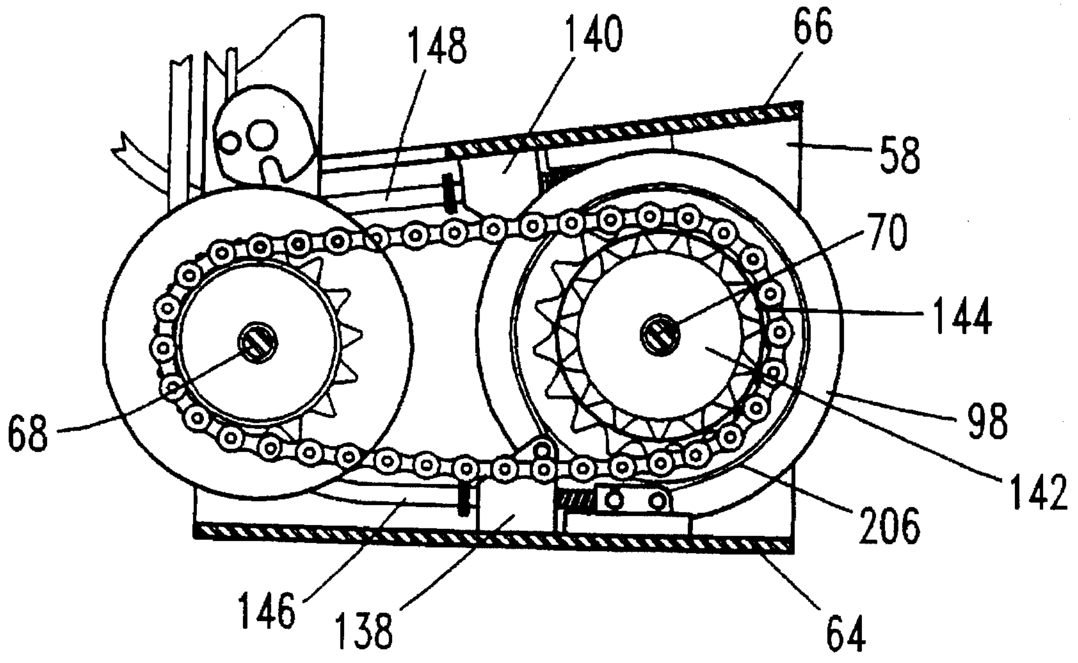
FIG. 9 is a side elevation view of a portion of the left hand transmission showing particularly the brake bands.

This positioning of the inner and outer cams 88, 90 is controlled in part by an actuator mechanism 96 shown best in FIG. 8. The actuator mechanism 96 can be mounted at various locations, and is preferably mounted on the oar lever 92 which extends upwardly from oar hub axle 68 to an upper extremity which can be readily gripped by an operator. The lever 92 includes at the upper extremity an activator such as a handle grip 94. The handle grip 94 is movable between a generally vertical position aligned with the lever 92 and a generally horizontal position normal to the lever 92. In FIG. 1 the handle 94 is shown in the aligned orientation on the operator's left hand side, and is shown in the normal orientation on the operator's right hand side. Movement between the aligned and normal positions is interconnected with a planetary gear system 98 to hold the planetary system in one of two operational positions described more fully hereinafter.

The actuator 96 mechanism includes a bar 100 pivotally mounted to the lever 92 at pivot axis 102. The bar 100 is connected to an inner cam control rod 104 and an outer cam control rod 106. Inner cam control rod 104 is connected at its other extremity to inner cam 88, and outer cam control rod 106 is connected at its other extremity to outer cam 90. Bar 100 includes a cam surface 108 having an inner rise 110, an outer rise 112 and a central detent 114. A follower 116 is biased by a spring 118 into contact with cam surface 108. The actuator bar 100 is shown in FIG. 8 in solid in a first position wherein the cam follower 116 is on the inner rise 110 and the cam rod 106 is in a forward drive position placing the outer cam 90 in the position shown in FIG. 7A. The actuator bar 100 is movable to the position shown in phantom in FIG. 8 wherein the cam follower 116 is on the outer rise 112 and the cam control rod 104 is in a rearward drive position placing the outer cam 90 in the position shown in FIG. 7B. The actuator bar 100 can also be placed in a position wherein the cam follower 116 is on the central detent 114. In that position inner and outer cams 88 and 90 are in an intermediate position allowing free wheeling of both the inner and outer friction drums 84 and 86 in either the clockwise or counterclockwise direction. Movement of the bar 100 simultaneously positions inner cam 88 and outer cam 90.

When outer cam 90 is in the position shown in FIG. 7A and oar lever 92 is rotated counterclockwise, outer cam 90 would tend to rotate counterclockwise about an axis 120 due to the contact of a surface 122 of cam 90 tending to roll along an outer surface 124 of outer friction drum 86. However, outer cam 90 is shaped and affixed to oar lever 92 so as to rotate eccentrically about axis 120, and thus outer cam 90 becomes wedged between axis 120 and outer surface 124 of outer friction drum 86. In this manner wedged cam 90 is prevented from rotating further about axis 120 and surface 122 imposes a high normal force onto outer surface 124 resulting in a friction force which rotates outer friction drum 86, outer cam 90, and lever 92 as a unit counterclockwise. Since outer sprocket 78 is affixed to and rotates with outer friction drum 86, the counterclockwise output arrived at as described above is available for driving the planetary gear system 98 via chain 128.

When outer cam 90 is in the position shown in FIG. 7A and oar lever 92 is rotated clockwise, outer cam 90 tends to rotate clockwise about axis 120 due to surface 122 tending to roll along surface 124 of outer friction drum 86. As outer cam 90 rotates eccentrically clockwise about axis 120, surface 122 eventually loses contact with surface 124 or a gap 126 in outer cam 90 is encountered and no frictional force is developed between outer cam 90 and outer friction drum 86. Thus, clockwise movement of oar lever 92 can be achieved with no imposition of torque onto outer friction drum 86.

When outer cam 90 is in the position shown in FIG. 7A, inner cam 88 is in a position to allow a clockwise torque to be applied to inner friction drum 84 via oar lever 92 and to allow inner friction drum 84 to freewheel in the counterclockwise direction. While at no time are both the inner cam 88 and outer cam 90 in the wedged restraint positions, both cams can be simultaneously placed in an intermediate freewheel position.

When actuator bar 100 is in the position shown in phantom in FIG. 8, cam 90 is in the position shown in FIG. 7B allowing a clockwise torque to be applied to outer friction drum 86 and to allow outer friction drum 86 to freewheel in the clockwise direction. Also with the actuator bar in this position inner cam 88 is in a position to allow a counterclockwise torque to be applied to inner friction drum 84 and to allow inner friction drum 84 to freewheel in the counterclockwise direction.

The various functions and resulting force outputs of the oar lever 92 and hub assembly, also referred to as a double clutch ratchet assembly 162, are summarized in Table I.

TABLE I

| | DRIVEN DIRECTION | | FREEWHEEL DIRECTION | |
|---|---|---|---|---|
| Actuator Lever (100) Position | Inner Friction Drum (84) | Outer Friction Drum (86) | Inner Friction Drum (84) | Outer Friction Drum (86) |
| Forward (Solid) | CW | CCW | CW | CCW |
| Rearward (Phantom) | CCW | CW | CCW | CW |

Figure 4:
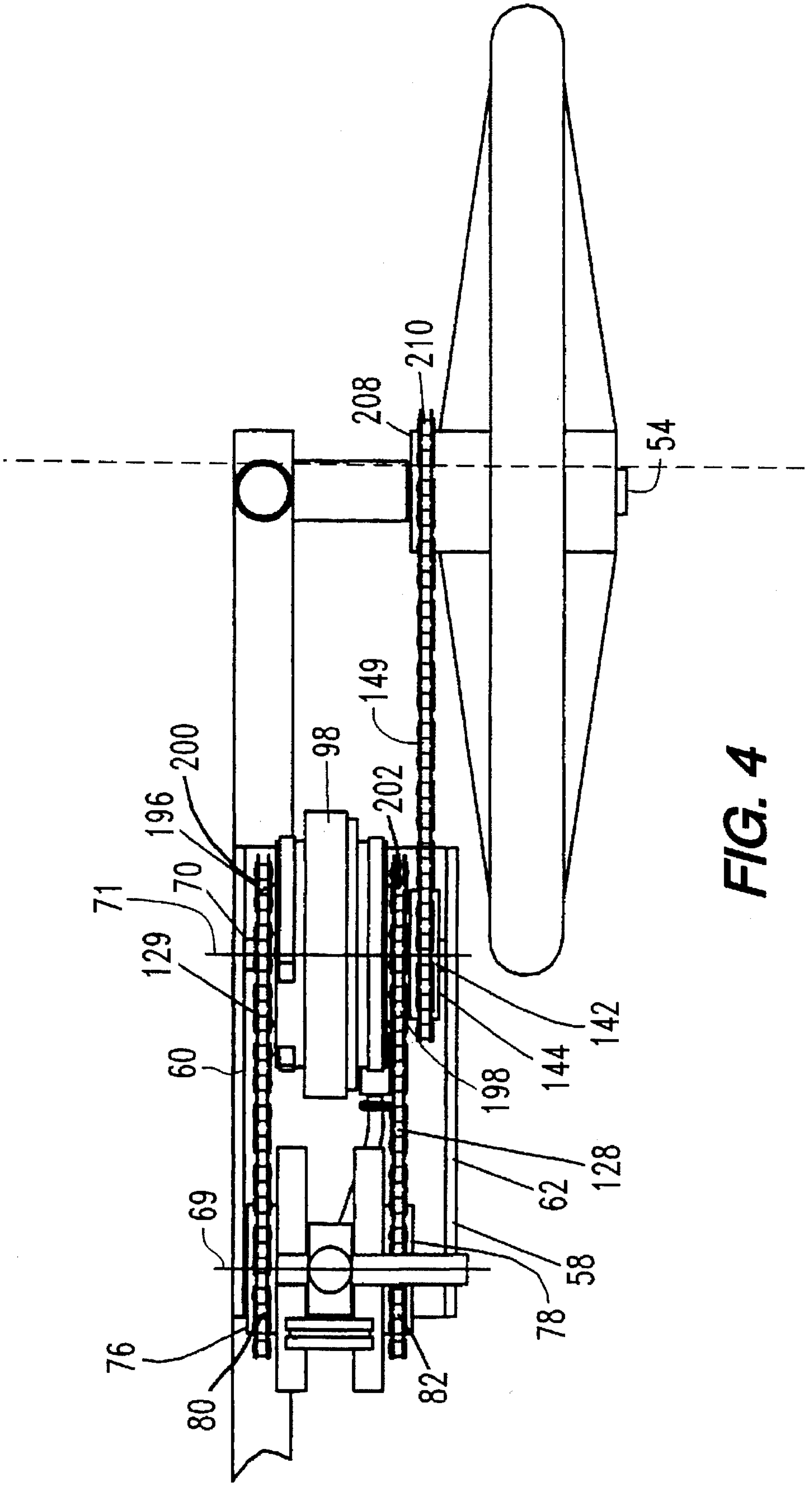
FIG. 4 is a top view of a portion of the left hand transmission assembly and left hand aft wheel.
Figure 5:
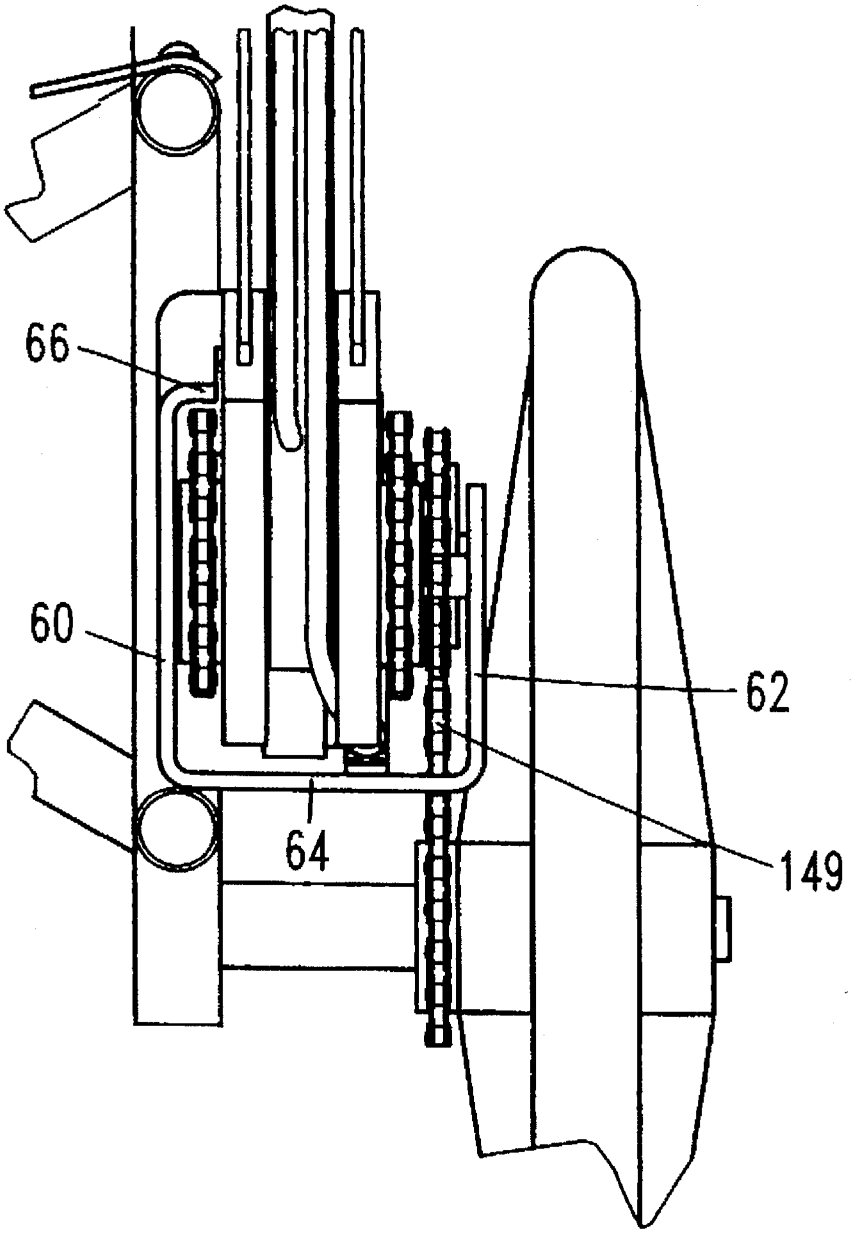
FIG. 5 is a front elevation view of a portion of the left hand transmission assembly and left hand aft wheel.
Figure 10:
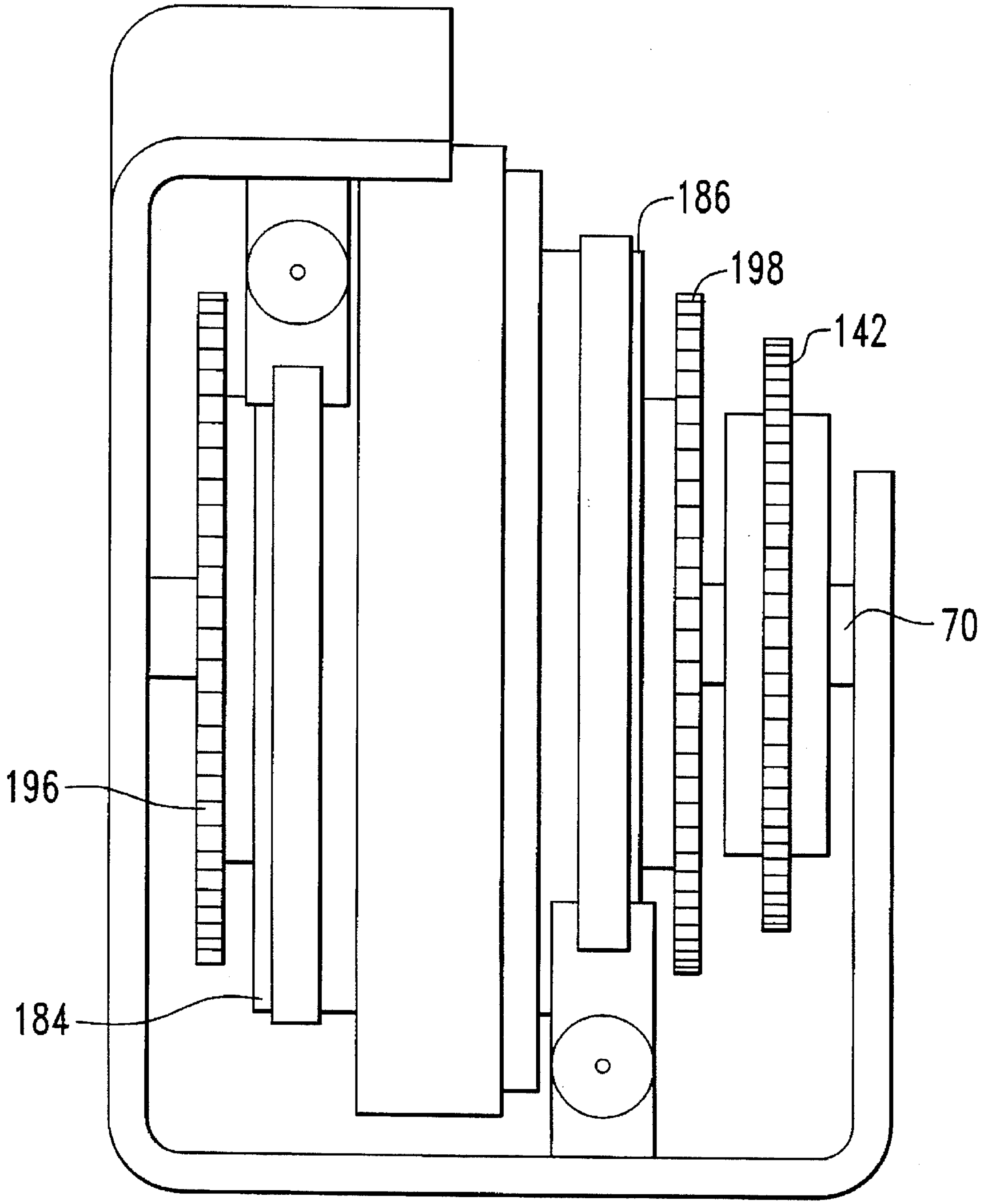
FIG. 10 is a front elevation view of a portion of the left hand transmission showing particularly portions of a planetary gear assembly.
Figure 11:
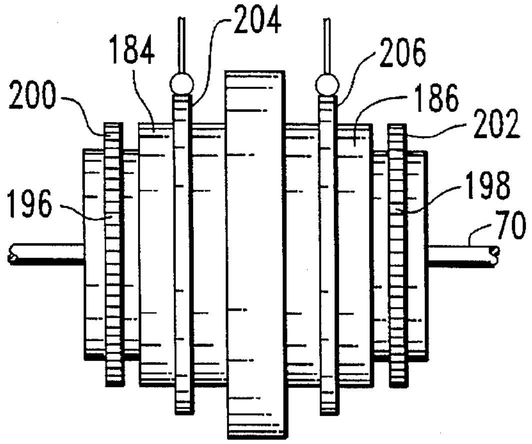
FIG. 11 is a schematic elevation view of a planetary gear assembly in accordance with the invention.

The planetary gear assembly 98 is shown best in FIGS. 10 through 12. It includes a ring gear support 184, a planet carrier 186 with pinions 188, a sun gear 190, two or more and preferably three planet gears 192 rotating on the pinions 188, ring gear 194 rigidly affixed to ring gear support 184, axle 70, and sprockets 196, 198. Sprocket 196 is rigidly affixed to ring gear support 184, and sprocket 198 is rigidly affixed to planet carrier support 186. Sun gear 190 is rigidly affixed to rotate with shaft 70. Sprocket 196 includes exterior teeth 200, and sprocket 198 includes exterior teeth 202. As seen in FIG. 4, exterior teeth 202 are aligned with the outer teeth 82 of outer sprocket 78. Exterior teeth 200 are aligned with the inner teeth 80 of inner sprocket 76. Drive chain 129 is mounted about teeth 200 and 80, and drive chain 128 is mounted about teeth 202 and 82. It will be recognized that although shown as an interaction of teeth and chains, throughout the transmission assemblies other mechanical force transmitting components such as belts can be used.

Rigidly interconnected to rotate with axle 70 is an intermediate drive gear 142 with teeth 144. Rigidly affixed to rotate with axle 54 is a final drive gear 208 with teeth 210. Drive chain 149 is mounted about teeth 210 of final drive gear 208 and teeth 144 of intermediate drive gear 142.

Figure 12A:
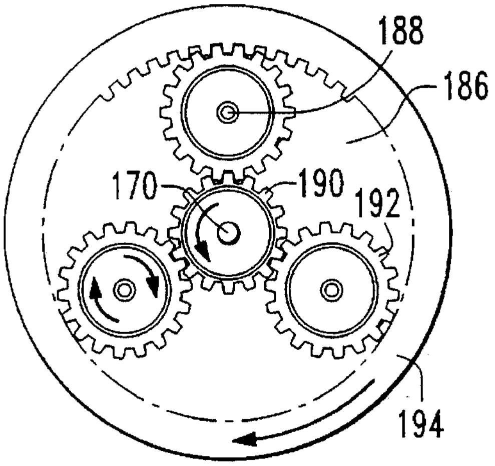
FIGS. 12A and 12B are schematic plan views of the planetary gear assembly mounted on the planet carrier of the invention with the ring gear superimposed about the planet gears.

Operation of the planetary gear system 98 is well known in the art. With the assembly shown, output rotation of shaft 70 can be selectively directed in a clockwise or counter-clockwise direction as viewed in FIGS. 12A and 12B by selectively holding fixed the ring gear support 184 and ring gear 194 or the planet carrier support 186 and pinions 188. As shown in FIG. 12A, when the planet carrier support 186 and its pinions 188 are held fixed as ring gear 194 is provided an input torque in a clockwise direction, then planet gears 192 rotate clockwise and drive sun gear 190 and axle 70 in a counter-clockwise rotation.

Figure 12B:
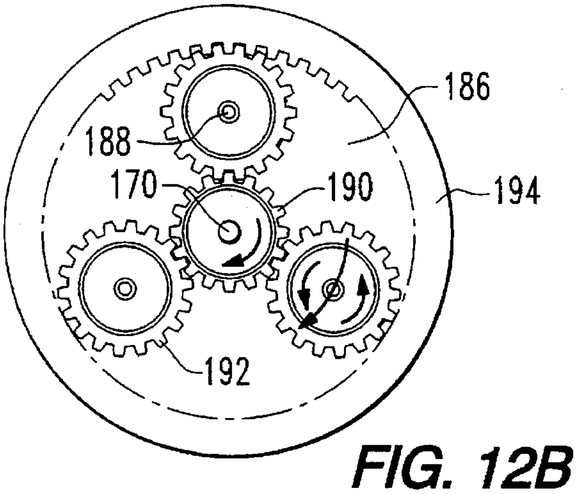

As shown in FIG. 12B, when ring gear support 184 and ring gear 194 are held fixed and planet carrier support 186 and its pinions 188 are provided an input torque in the clockwise direction, then planet gears 192 rotate counter-clockwise and drive sun gear 190 and axle 70 in a clockwise rotation.

The handle grip 94 is interconnected to the planetary assembly through a ring gear cable 148 and planet carrier cable 146. Cable 148 actuates a ring gear band 204 to tighten against and restrain motion of the ring gear 184. Cable 146 actuates a planet carrier band 206 to tighten against and restrain motion of planet carrier 186. The tightening and loosening of the bands 204, 206 is accomplished by the alternate movement of the handle grip 94 between the aligned and normal positions. Thus, movement of the handle grip to one of the two positions moves the cables 148, 146 to set the planetary system.

Figure 14A:
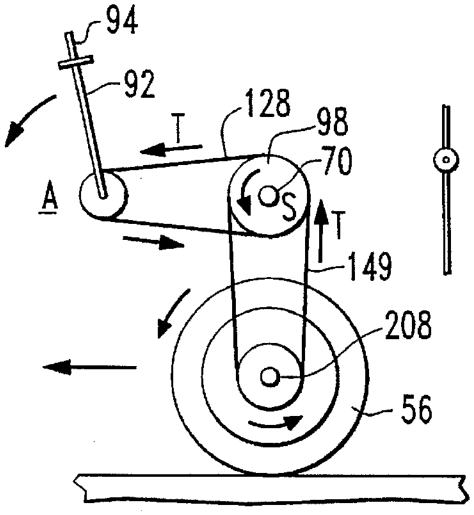
FIGS. 14A, 14B 14C and 14D are schematic illustrations of various positions of the drive train of the invention.
Figure 14B:
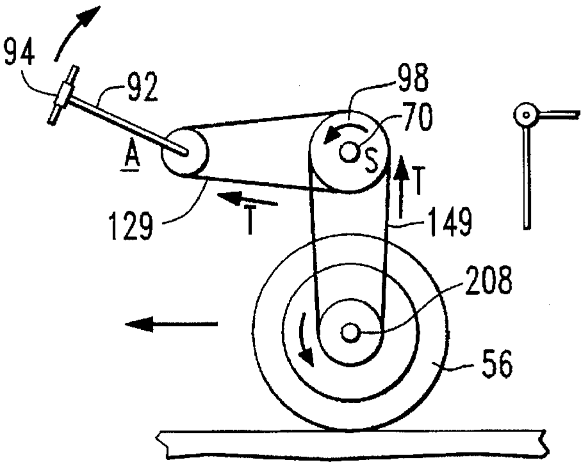

Referring now to FIGS. 14A, 14B, 14C, and 14D, there is schematically illustrated the operation of the drive system. The planetary gear assembly 98 functions to drive axle 70 in a clockwise or counter-clockwise rotation. For descriptive purposes these rotational directions are herein referred to and shown in FIGS. 14A–D as standard or same direction rotation (indicated as "S") and reversed or rectified direction rotation (indicated as "R") . Referring to FIG. 1 and as shown in FIGS. 14A and 14B, when actuator 100 is in the solid line position as shown in FIG. 8, the planetary gear assembly 98 is in the orientation for standard direction rotation ("S"). With handle grip 94 in the aligned position, as lever 92 is moved forwardly (FIG. 14A) and drive chain 128 is tensioned ("T"), ring gear support 184 is held fixed through tensioning of cable 148, and planet carrier support 186 and drive chain 149 rotate in a counter-clockwise direction as viewed in FIG. 14A. This drives axle 70 and intermediate drive gear 198 in a counter-clockwise rotation, which drives drive chain 149 and final drive gear 208 in a counter-clockwise rotation, which drives drive wheel 56 counter-clockwise so that the wheel chair 10 moves forwardly. Thus, forward motion of the lever 92 moves the wheelchair forward.

The forward motion of the wheelchair is also achieved upon rearward motion of the lever. This occurs, as shown in FIG. 14B, when actuator 100 is in solid line position, as shown in FIG. 8 and when handle grip 94 is placed in its second position, normal to the lever 92, and the lever 92 is pulled rearwardly (clockwise in FIG. 14B). In this configuration, as lever 92 is moved rearwardly and drive chain 129 is tensioned, planet carrier support 186 is held fixed through tensioning of cable 146, and ring gear support 184 and drive chain 129 rotate in a clockwise direction as viewed in FIG. 14B. This drives axle 70 and intermediate drive gear 198 in a counterclockwise rotation, which drives drive chain 149 and final drive gear 208 in a counter-clockwise rotation, which drives wheel 56 counterclockwise so that the wheel chair 10 moves forwardly.

Figure 14C:
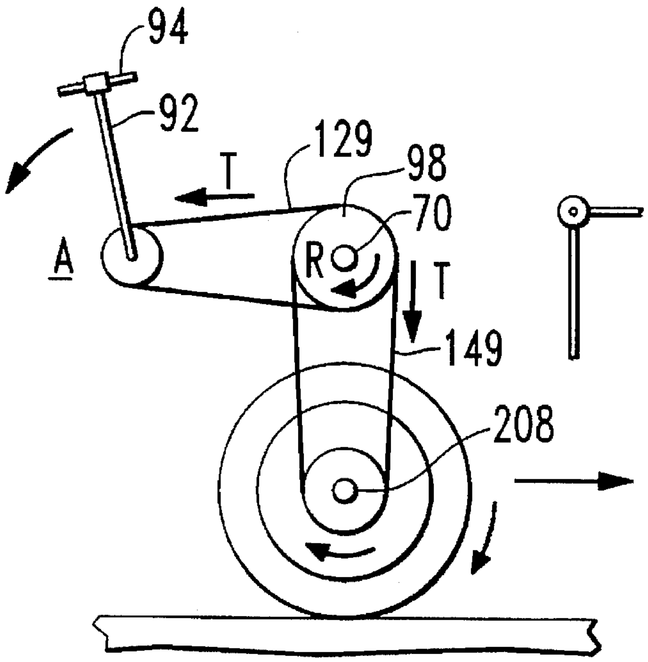
Figure 14D:
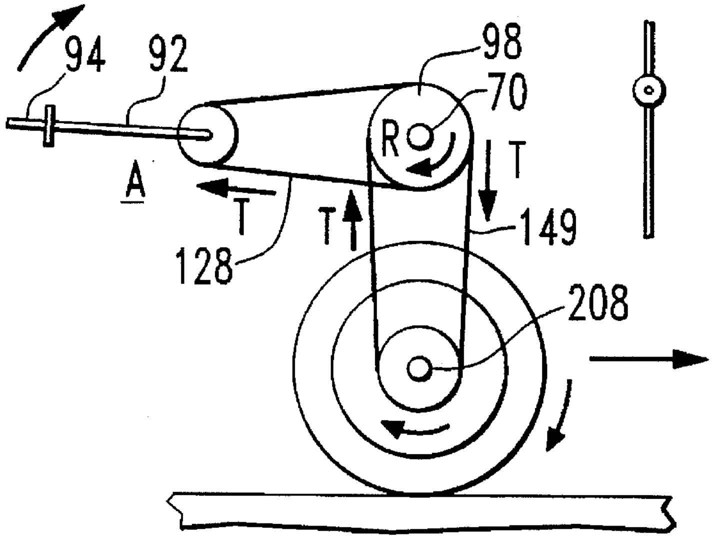

Similarly, rearward motion is achieved as shown in FIGS. 14C and 14D. With reference to FIGS. 1 and 14C, with actuator 100 in phantom position as shown in FIG. 8 and handle grip 94 is placed in its second position, normal to lever 92, and the lever 92 is pushed forwardly (counter-clockwise in FIG. 14C), drive chain 129 is tensioned. As drive chain 129 is tensioned, planet carrier support 186 is held fixed through tensioning of cable 146, and ring gear support 184 and drive chain 129 rotate in a counter-clockwise direction as viewed in FIG. 14C. This drives axle 70 and intermediate gear 198 in a clockwise rotation, which drives drive chain 149 and final drive gear 208 in a clockwise rotation, which drives wheel 56 clockwise so that the wheel chair 10 moves rearwardly. Thus, forward motion of lever 92 moves the wheel chair rearward.

The rearward motion of the wheel chair 10 is also achieved upon rearward motion of the lever. With reference to FIGS. 1 and 14D, with actuator 100 in phantom position as shown in FIG. 8 and when handle grip 94 is placed in its first position, axially aligned with lever 92, and the lever 92 is pulled rearwardly (clockwise in FIG. 14D), drive chain 128 is tensioned. As drive chain 128 is tensioned, ring gear support 184 is held fixed through tensioning of cable 148, and planet gear support 186 and drive chain 128 rotate in a clockwise direction as viewed in FIG. 14D. This drives axle 70 and intermediate drive gear 198 in a clockwise rotation, which drives drive chain 149 and final drive gear 208 in a clockwise rotation, which drives drive wheel 56 clockwise so that the wheel chair 10 moves rearwardly.

These configurations are also indicated in Table I.

TABLE I

| HP | LM | C129 | C128 | C146 | C148 | RG194 | P188 | SG190 | CM10 | ACT |
|---|---|---|---|---|---|---|---|---|---|---|
| A | D | F | T | F | T | S | M | CCW | F | S |
| N | U | T | F | T | F | M | S | CCW | F | S |

TABLE I-continued

| HP | LM | C129 | C128 | C146 | C148 | RG194 | P188 | SG190 | CM10 | ACT |
|---|---|---|---|---|---|---|---|---|---|---|
| N | D | T | F | T | F | M | S | CW | R | P |
| A | U | F | T | F | T | S | M | CW | R | P |

HP: Handle (94) Position "A" = Aligned with Lever "N" = Normal to Lever
LM: Lever (92) Movement "U" = Upwardly "D" = Downwardly
C129: Chain (129) "T" = Tensioned "F" = Free
C128: Chain (128) "T" = Tensioned "F" = Free
C146: Cable (146) "T" = Tensioned "F" = Free
C148: Cable (148) "T" = Tensioned "F" = Free
RG: Ring Gear (194) "M" = Moving "S" = Stationary
P: Pinions (188) "M" = Moving "S" = Stationary
SG: Sun Gear (190) "CW" = Clockwise "CCW" = Counter-Clockwise
CM: Chair (10) Motion "F" = Forward "R" = Rearward
ACT: Actuator (100) see FIG. 8 "P" = Phantom Position, and "S" = Solid Line Position It will be apparent to those skilled in the art that modification of the gear ratios of the planetary system and the entirety of the transmission can be made to modify the torque required to drive the wheelchair 10. Thus, different ratios can be used for different users or for different uses by the same user.

It will also be apparent that through different combinations of handle grip 94 orientation and lever 92 direction, the operator can selectively control input to the drive wheels for forward or rearward rotation. Various combinations will allow turning in one direction or another.

Figure 13:
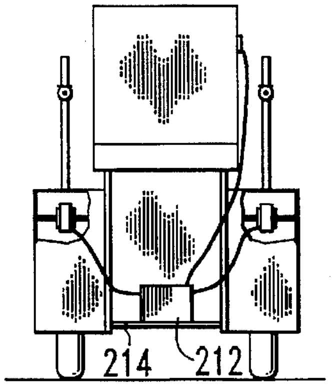
FIG. 13 is a rear elevation view of another embodiment of the invention incorporating a power drive.

It will now be apparent that the invention provides a wheelchair which the operator can drive through a coordinated rowing motion. The operator pulls rearwardly with the handle grips in the horizontal orientation, and pushes forwardly with the handle grips in the aligned orientation. It will also be apparent that the various components can be actuated and integrated in manners other than as specifically shown. For example, the motion of the handle grip need not be between aligned and normal, but can encompass a differing degree of motion or a differing motion. The actions which are activated by movement of the handle, cooperating with the dual ratchet and the planetary system, can be accomplished with other structures and motions, such as the squeezing and releasing of a member. And, the seating area can be mounted to the frame to raise or lower, or to move forwardly or rearwardly. The wheelchair conveyance system is readily adaptable to addition of a battery or otherwise powered motor drive or a motor drive assist. As shown schematically in FIG. 13, a battery powered motor 212 can be mounted below the operator on a bottom support plate 214 affixed between left and right inner frames 28.

Many other modifications and additions are possible. It is therefore intended that within the scope of the appended claims, the invention can be practiced other than as specifically described.

We claim:

1. A wheelchair comprising:

a frame;

a pair of rotatable drive wheels mounted to said frame;

a pair of levers mounted to said frame for reciprocating generally arcuate motion, each lever supporting a movable grip;

a pair of sprockets associated with each lever for transferring reciprocating generally arcuate motion of each said lever into a sprocket output torque in two rotational directions;

a planetary gear system associated with each said pair of sprockets for receiving said sprocket output torque in two rotational directions and transferring said sprocket output torque into a gear output torque in a single rotational direction, said planetary gear system having a first element and a second element; and a linkage for transferring each said gear output torque to one of said wheels.

2. The wheelchair of claim 1 wherein said grip is reciprocatingly movable with respect to said lever between a first grip position selectively interconnecting said lever and said first element of said planetary gear system and a second grip position selectively interconnecting said lever and said second element of said planetary gear system.

3. The wheelchair of claim 2 wherein each said lever is mounted on an opposite side of said wheelchair and extends generally upwardly, and wherein each said grip is a handle mounted at an upper extremity of each said lever for movement between a first aligned position generally aligned with said lever and a second normal position generally normal to said lever.

4. The wheelchair of claim 1 wherein said pair of sprockets are a first sprocket and a second sprocket positioned on a common axis and rotatable about said axis upon reciprocating arcuate motion of said lever.

5. The wheelchair of claim 4 further comprising an actuator for selectively setting said sprockets such that said first sprocket provides an output torque in one of said two rotational directions when said second sprocket freewheels, and such that said second sprocket provides an output torque in the other of said two rotational directions when said first sprocket freewheels.

6. A wheelchair comprising:

a frame;

a pair of rotatable drive wheels mounted to said frame;

a pair of levers mounted to said frame for reciprocating generally arcuate motion, each lever supporting a movable grip;

a pair of sprockets associated with each lever for transferring reciprocating generally arcuate motion of each said lever into a sprocket output torque in two rotational directions, said pair of sprockets being a first sprocket and a second sprocket positioned on a common axis and rotatable about said axis upon reciprocating arcuate motion of said lever;

a gear system associated with each said pair of sprockets for receiving said sprocket output torque in two rotational directions and transferring said sprocket output torque into a gear output torque in a single rotational direction, said gear system having a first element and a second element;

a linkage for transferring each said gear output torque to one of said wheels;

an actuator for selectively setting said sprockets such that said first sprocket provides an output torque in one of said two rotational directions when said second sprocket freewheels, and such that said second sprocket provides an output torque in the other of said two rotational directions when said first sprocket freewheels, said actuator comprising a first cam affixed to said lever and selectively positionable to wedge against said first friction drum such that said lever, first friction drum and first sprocket rotate as a single unit to transmit a torque, and said actuator further comprising a second cam affixed to said lever and selectively positionable to wedge against said second drum such that said lever, second friction drum and second sprocket rotate as a single unit to transmit a torque; and a first friction drum rigidly affixed to rotate about said common axis together with said first sprocket and a second friction drum rigidly affixed to rotate about said common axis together with said second sprocket.

7. The wheelchair of claim 6 further comprising a first control rod interconnected with said first cam and said grip, and a second control rod interconnected with said second cam and said grip, and movement of said grip between said first grip position and said second grip position moves said first cam into and out of said position wedged against said first friction drum.

8. The wheelchair of claim 6 further comprising a first band mounted to selectively restrain said first element of said gear system and a second band mounted to selectively restrain said second element of said gear system, said first band restraining one of said first element and said second element when said grip is in said first grip position and said second band restraining the other of said first and said second element when said grip is in said second grip position.

9. A wheelchair comprising:

a frame;

a pair of rotatable drive wheels mounted to said frame;

a pair of levers mounted to said frame for reciprocating generally arcuate motion, each lever supporting a movable grip, said grip being reciprocatingly movable with respect to said lever between a first grip position and a second grip position;

a pair of sprockets associated with each lever for transferring reciprocating generally arcuate motion of each said lever into a sprocket output torque in two rotational directions;

a gear system associated with each said pair of sprockets for receiving said sprocket output torque in two rotational directions and transferring said sprocket output torque into a gear output torque in a single rotational direction, said gear system having a first element and a second element;

a linkage for transferring each said gear output torque to one of said wheels; and a first band mounted to selectively restrain said first element of said gear system and a second band mounted to selectively restrain said second element of said gear system, said first band restraining one of said first element and said second element when said grip is in said first grip position and said second band restraining the other of said first and said second element when said grip is in said second grip position.

10. A transmisssion system for a wheel chair comprising:

a. a rotatable lever;

b. a double ratchet pivot having a first sprocket and a second sprocket;

c. said double ratchet pivot interconnected to cooperate with said lever such that upon rotation of said lever in a first direction, said first sprocket is rotated to transmit a force, and upon pivoting rotation of said lever in the opposite direction, said second sprocket is rotated to transmit a force;

d. a planetary gear assembly having a planet carrier support, a planet carrier sprocket affixed to said planet carrier support, a ring gear and a ring gear sprocket affixed to said ring gear;

e. a first chain interconnecting said first sprocket and one of said planet carrier sprocket and ring gear sprocket;

f. a second chain interconnecting said second sprocket and the other of said planet carrier sprocket and ring gear sprocket;

g. a handle grip affixed to said lever to articulate between an initial position and a secondary position;

h. a first tensioning cable interconnecting said handle grip and one of said planet carrier support and ring gear to selectively restrain said one of said planet carrier support and ring gear upon articulation of said handle grip to said initial position; and i. a second tensioning cable interconnecting said handle grip and the other of said planet carrier support and ring gear to selectively restrain said other of said planet carrier support and ring gear upon articulation of said handle grip to said secondary position.

11. A transmission adaptable to a wheelchair having a seat and a rotatable drive wheel, said transmission comprising a hand operable drive train for driving said wheel, said drive train including a planetary gear assembly and bands to selectively restrain a first portion and a second portion of said planetary gear assembly, a hand operable lever mounted for reciprocating arcuate motion, said lever having a grip movable between a first orientation and a second orientation to respectively restrain said first portion and second portion of said planetary gear assembly, and a double ratchet subassembly, said double ratchet subassembly including an inner friction drum rotatable forwardly and rearwardly and an outer friction drum rotatable forwardly and rearwardly, each said inner and outer friction drum being selectively restrainable from motion in one of said forwardly and rearwardly rotational directions, said drive train further including a chain for interconnecting said planetary gear assembly and said drive wheel, said planetary gear assembly, lever, grip and double ratchet subassembly cooperating to drive said wheel in a forwardly rotating direction upon coordinated reciprocating arcuate rotation of said lever and movement of said grip between said first and second orientation.

12. The transmission of claim 11 wherein said first orientation of said grip is generally aligned with an extremity of said lever and said second orientation is generally normal to said lever.

13. The transmission of claim 12 wherein said grip is movable through a rowing motion to drive said wheelchair.

14. A wheel chair system comprising:

a frame;

a seat supported by said frame;

a left hand and a right hand drive wheel rotatably mounted to said frame;

a left hand and a right hand transmission mounted to said frame and respectively driving said left hand and right hand wheels, each said transmission including a planetary gear train having a ring gear restrainable by a ring gear band, a planet carrier support restrainable by a planet carrier band, and a planetary shaft rotatable with said planet carrier support;

a double ratchet sprocket assembly having an inner sprocket cooperating with an inner cam, an outer sprocket cooperating with an outer cam, a lever pivotable through limited forward and rearward reciprocating motion, and an activator for selectively engaging said cams and sprockets to restrain rotation in one direction of said inner and outer sprockets upon said transmission causing simultaneous selective restraining of said ring gear by said ring gear band and said planet carrier support by said planet carrier band;

an inner chain interconnecting said inner sprocket and one of said ring gear and planet carrier support;

an outer chain interconnecting said outer sprocket and the other of said ring gear and planet carrier support; and a drive chain interconnecting said planetary shaft and one of said drive wheels.

15. The wheel chair system of claim 14 wherein said lever comprises a handle grip movable between a first orientation generally aligned with said lever and a second orientation generally normal to said lever.

16. A wheel chair system comprising:

a frame;

a seat supported by said frame;

a left hand and a right hand drive wheel rotatably mounted to said frame;

a left hand and a right hand transmission mounted to said frame and respectively driving said left hand and right hand wheels, each said transmission including a planetary gear train having a ring gear, a planet carrier support and a planetary shaft rotatable with said planet carrier support;

a double ratchet sprocket assembly having an inner sprocket, an outer sprocket, a lever pivotable through limited forward and rearward reciprocating motion, and an activator for selectively restraining rotation in one direction of said inner and outer sprockets and for simultaneously selectively restraining motion of one of said ring gear and planet carrier support;

said activator comprising a handle movable between a first orientation and a second orientation, cams for frictionally restraining said inner and outer sprockets, and bands for frictionally restraining said ring gear and planet carrier support;

an inner chain interconnecting said inner sprocket and one of said ring gear and planet carrier support;

an outer chain interconnecting said outer sprocket and the other of said ring gear and planet carrier support; and a drive chain interconnecting said planetary shaft and one of said drive wheels.

* * * * *